Figure 3:
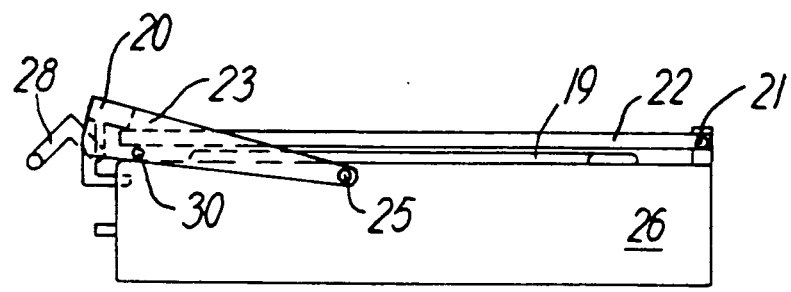

United States Patent [19]

Hagedorn-Olsen

[11] Patent Number: 5,055,873
[45] Date of Patent: Oct. 8, 1991

[54] REPROGRAPHIC APPARATUS

[75] Inventor: Jens Hagedorn-Olsen, Hornbaek, Denmark

[73] Assignee: Helioprint A/S, Denmark

[21] Appl. No.: 411,502

[22] PCT Filed: Apr. 11, 1988

[86] PCT No.: PCT/DK88/00065
§ 371 Date: Oct. 5, 1989
§ 102(e) Date: Oct. 5, 1989

[87] PCT Pub. No.: WO88/08153
PCT Pub. Date: Oct. 20, 1988

[30] Foreign Application Priority Data

Apr. 10, 1987 [DK] Denmark .............................. 1865/87

[51] Int. Cl.⁵ ............................................ G03B 27/62
[52] U.S. Cl. ...................................... 355/75; 355/91; 355/93
[58] Field of Search ..................... 355/76, 91, 92, 93, 355/94

[56] References Cited

U.S. PATENT DOCUMENTS

| 563,888 | 7/1896 | Sack | 355/91 |
|---|---|---|---|
| 1,315,882 | 9/1919 | Sweigard | 355/93 |
| 1,742,372 | 1/1930 | Taylor | 355/94 |
| 3,420,608 | 1/1969 | Canale | 355/91 |
| 3,995,955 | 12/1976 | Topfer | 355/76 |
| 4,536,085 | 8/1985 | Hliboki et al. | 355/94 |

Primary Examiner—Monroe H. Hayes
Attorney, Agent, or Firm—Sughrue, Mion, Zinn Macpeak & Seas

[57] ABSTRACT

A reprographic apparatus has a copyboard for holding a document to be exposed in a flat position in an exposure plane. The copyboard includes a support plate defining the exposure plane with transparent plate arranged above the plate and being pivotally connected therewith along one side edge. A releasable hold-down mechanism locks the glass plate in an operative position in which it holds the document in pressurized contact with the support plate. A movable pressure bar extends in parallel to the pivotally connected side edge of a glass plate, the bar being connected at its ends with side plates, which are displaceably and pivotally connected to a housing of the copyboard.

Such an apparatus is known for instance from the EP 0 085 862. After a document has been placed in the exposure plane between the two plates of the reprographic apparatus, a hold-down mechanism (or lock) presses the transparent plate against the document on the support plate, and air still present between the two plates can be extracted by suction in order to achieve a flat exposure position of the document. The lock is provided with an extension to overcome spring forces when unloading an original.

A disadvantage of the described system is that it can only handle documents with a size smaller than that of the transparent plate as, otherwise, the hold-down mechanism would damage or destruct the document.

3 Claims, 2 Drawing Sheets

REPROGRAPHIC APPARATUS

The invention relates to a reprographic apparatus comprising a copyboard for holding a document to be exposed in a flat position in an exposure plane, said copyboard including a support plate defining the exposure plane, a glass or otherwise transparent plate arranged above said plate and being pivotally connected therewith along one side edge, and a releasable hold-down mechanism to lock the glass plate in an operative position in which it holds the document in pressurized contact with the support plate.

Such an apparatus is known for instance from the EP 0 085 862. After the document has been placed in the exposure plane between the two plates of the reprographic apparatus, a hold-down mechanism (or lock) presses the transparent plate against the document on the support plate, and air still present between the two plates can be extracted by suction in order to achieve a flat exposure position of the document. The lock is provided with an extension to overcome spring forces when unloading an original.

A disadvantage of the described system is that it can only handle documents with a size smaller than that of the transparent plate as, otherwise, the hold-down mechanism would damage or destruct the document.

It is therefore an object of this invention to provide a reprographic apparatus comprising a copyboard without the above described disadvantage. For this purpose a reprographic apparatus according to the invention is characterized in that the hold-down mechanism can be brought into a second position in which it is completely below the explosure plane. With such an apparatus even documents of a large size compared to the transparent plate may be reproduced because it is possible to expose a document part-by part without any risk of damaging the remainder of the document, since it has surprisingly appeared that the large size document can be held sufficiently flat for exposure by the weight of the transparent plate, without the hold-down mechanism.

In a preferred embodiment the hold-down mechanism comprises a movable pressure bar that extends parallel to the pivotally connected side edge of the glass plate along the opposite side thereof, the bar being provided at its ends with side plates, which are displaceably and rotatably connected to a housing of the support plate, and that said bar is provided with a locking mechanism.

Figure 4:
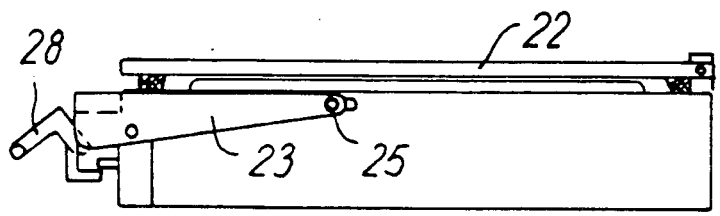
Figure 1:
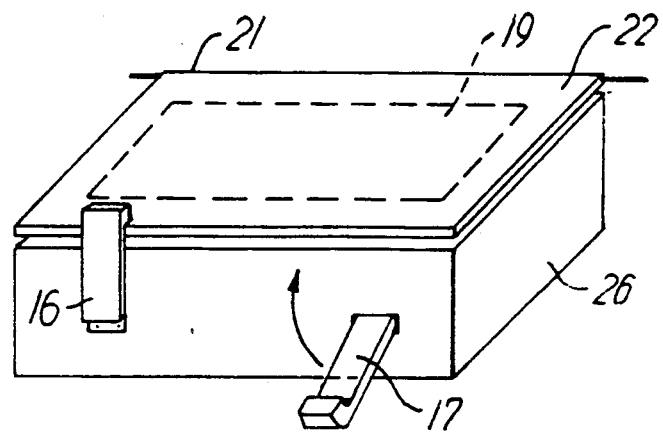
Figure 2:
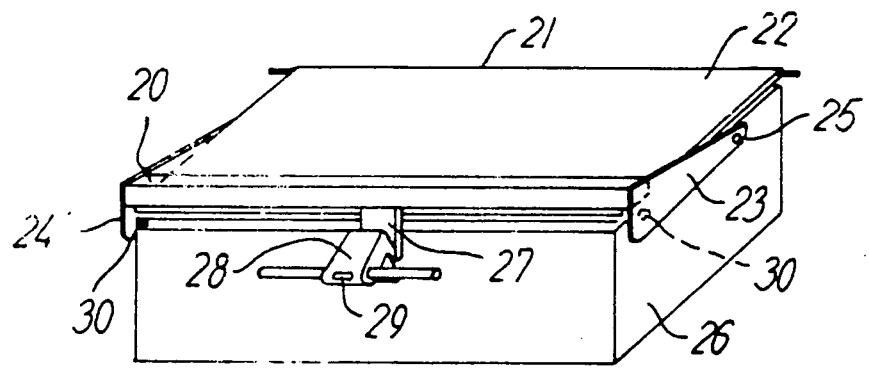

Other particulars and advantages of the apparatus according to the invention will be apparent from the following description with reference to the drawings, wherein FIG. 1 is a schematic perspective view of a first, relatively simple embodiment of the apparatus according to the invention, FIG. 2 a similar view of a second preferred embodiment, FIG. 3 a side view of the second embodiment with the copyboard in a first or operative position, FIG. 4 a similar view with the copyboard in a second or released position, and FIG. 5 again a similar view with the transparent plate of the copyboard in a third or open position.

The copyboard shown in FIG. 1 comprises a housing 26 which carries a support plate 19 consisting of a transparent flexible material, e.g. acrylic plastic. The glass plate 22 rests in a first position on the support plate 19 and pivotally connected with the support plate 19 along its rear side edge 21. A hold-down mechanism consisting of two hinged elements 16, 17 are capable of engaging the front side edge of the glass plate 22 to hold the glass plate in its first position in pressure contact with the support plate 19. The hinged elements 16 and 17 may, as shown for element 17, be retracted from engagement with the glass plate 22 and turned to a position completely below the support plate 19 to allow nondamaging reproduction of an original exceeding the size of the glass plate 22.

The copyboard shown in FIG. 2 comprises a housing 26', a support plate 19' and a pivotally mounted glass plate 22' in the same way as in FIG. 1. The hold-down mechanism comprises a bar 20 connected with sideplates 23, 24 which are supported for pivotal movement around an axis 25. The bar 20 is provided with a locking mechanism 27, 28 consisting of a downwardly projecting flange member 27, which is an integral with the bar 20', and a handle 28 connected therewith and having a latch member 31 by means of which, as shown in FIGS. 3 and 4, the handle 28 can be brought into first or second closed, locked positions, in which the latch member 31 engages either with a depression 32 in the front side of housing 26' or underneath a nose member 33 projecting from the housing. When retracted to disengage the latch member 31 from depression 32 or nose member 33 the handle 28 is brought to an open position. A push button 29 is provided to secure the locking mechanism in either the open or closed position. In its closed position the handle 28 may activate a switch (not shown) to switch on a vacuum system of the copy board. In its open position the handle 28 deactivates the switch and releases the vacuum system. Two projecting pins 30 which are provided on the sideplates 23, 24 functions lift-up means for the glass plate 22'.

In FIG. 3 the glass plate 22' with the hold-down mechanism is shown in its first position with the glass plate in pressure contact with the support plate 19' by the bar 20 engaging the front side edge of the glass plate 22'. The handle 28 is in the locked position and the switch means is activated to switch on the vacuum system.

A reprographic camera, which the invention is related to, comprises a stationary film holder, a movable lens system and a movable copyboard. When the handle 28 is moved from its closed position to its open position it may operate actuating means (not shown) to move the lens system quickly away from the copyboard into a certain position. To move the lens system back into its exposure position the handle 28 is brought back into its first or second closed position activating hereby the switch means.

To bring the hold-down mechanism into its second position as shown in FIG. 4, the handle 28 is retracted upwards to deactivate the vacuum switch means and move the lens system away from the copyboard. The bar 20' extending the front side edge of the glass plate 22' is retracted outside the glass plate and lowered into its second position in which it is completely below the exposure plane, making it possible to manipulate and expose documents larger than the support plate 19' and the glass plate 22'. When the handle 28 is brought into its second locked position by latch member 31 engaging underneath nose member 33 the switch means is activated to move the lens system back into its exposure position.

To allow the movement of bar 20' to get clear of the front side edge of the glass plate 22' the side plates 23, 24 are journalled in elongate holes 34 in the lateral sides of housing 26'.

Figure 5:
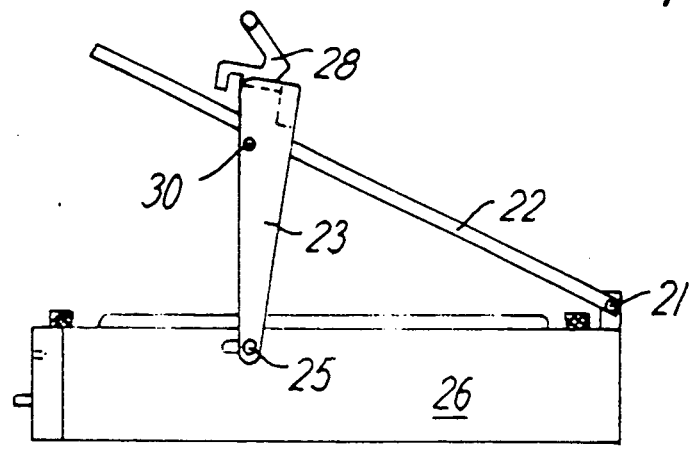

To reach its third position as shown in FIG. 5 the handle 28 is retracted upwards deactivating the vacuum switch means and in one continuous movement brought into its third stable position for replacement of the document from the copyboard. The glass plate 22 follows the movement of the bar 20 by means of the pins 30.

I claim:

1. A reprographic apparatus comprising; a housing having a copyboard for holding a document to be exposed in a flat position in an exposure plane, said copyboard having a support plate defining said exposure plane, a transparent plate positioned above said support plate and pivotally connected therewith along one side edge, a releasable hold-down mechanism to lock the glass plate in an operative position holding the document in pressurized contact with the support plate hold-down mechanism comprising a movable pressure bar (20) extending parallel to the pivotally connected side edge of the glass plate (22'), the pressure bar (20) connected at its ends with side plates (23, 24) displaceably and pivotally connected to said housing (26') of the copyboard, wherein the pressure bar (20) in a first operative position engages the front edge of the glass plate (22') to hold-down the document against the support plate (19') and said hold-down mechanism displaceably and pivotally connected to said housing (26') whereby the pressure bar (20) in a second operative position is moved away from the front edge of the glass plate (22') so that the mechanism is completely below the exposure plane.

2. Reprographic apparatus according to claim 1, characterized in that the pressure bar (20) comprises a handle (28) provided with a releasable locking mechanism (31) for engaging with complementary locking means (32, 33) on the housing (26).

3. A reprographic apparatus according to claim 1, characterized in that the side plates (23, 24) of the pressure bar (20) have lift-up means (30) arranged to engage the underside of the glass plate (22) to move the glass plate (22) away from the support plate (19) when the hold-down mechanism is moved to a third position allowing replacement of the document.

* * * * *